Jan. 3, 1967     O. SNYDER     3,295,657
COOKIE ALIGNING APPARATUS
Filed Aug. 10, 1964     3 Sheets-Sheet 1

INVENTOR
Orval Snyder
BY
Burton Perlman
ATTORNEYS

Jan. 3, 1967 O. SNYDER 3,295,657
COOKIE ALIGNING APPARATUS
Filed Aug. 10, 1964 3 Sheets-Sheet 2

INVENTOR
Orval Snyder
BY
Burton Ferlman
ATTORNEYS

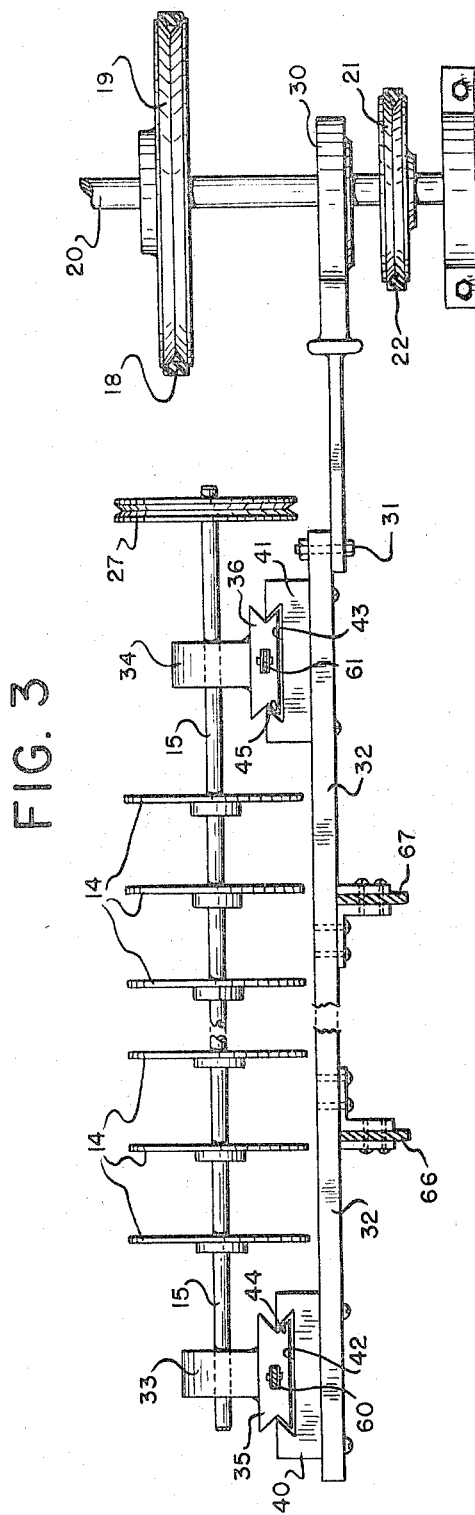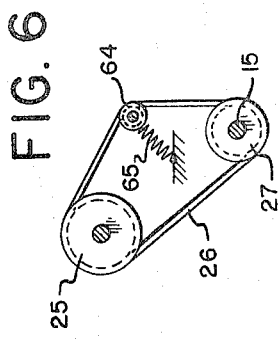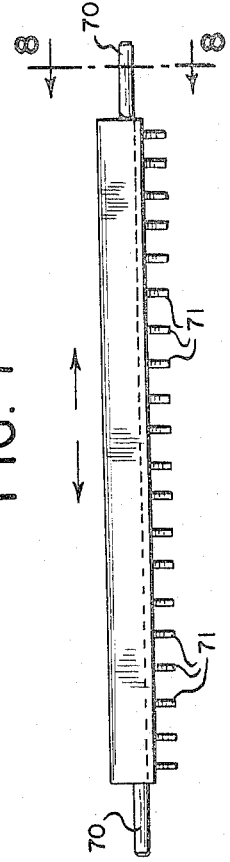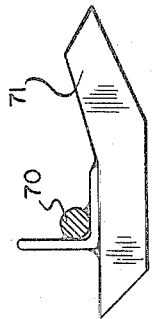

United States Patent Office 3,295,657
Patented Jan. 3, 1967

3,295,657
COOKIE ALIGNING APPARATUS
Orval Snyder, Richmond, Ind., assignor to Richmond Baking Company, Richmond, Ind., a corporation of Indiana
Filed Aug. 10, 1964, Ser. No. 388,514
8 Claims. (Cl. 198—30)

This invention relates to an apparatus for use in high-speed production and packaging of fragile objects such as cookies, and more particularly to an apparatus which will cause advancing ranks of cookies to assume a disposition which facilitates their handling for normal packaging procedures.

Frequenters of the supermarkets of today cannot avoid awareness of the fact that cookies and biscuits are produced and consumed in vast quantities. While this consumption is gratifying to the retailer and the packer, the handling of this vast quantity of cookies in production presents unique problems. A moment's reflection upon the large numbers involved, the relatively small dimensions of each cookies and the generally friable character of cookies will suffice to indicate the seriousness of the problems. While modern techniques cope admirably with the preparation of ingredients before packing, the feeding of dough to the ovens, and the simultaneous conveyance and baking involved in the actual baking operation itself, handling practices following the conveyance of cookies out of the oven is in need of improvement. It is at this point in the production flow that serious delays frequently occur simply because the means for moving cookies from the conveyor to the package is inadequate to keep up with the rate of delivery of cookies to this point.

Generally the movement of cookies from conveyor to package is a manual operation and this invention is concerned with facilitating this manual operation. The operator must pick up a series of cookies and carry them to a package, and the operator must do this at a high rate of speed. Therefore, the relative positioning of the cookies as they are delivered from the oven is a matter of great concern. Delivery by a conveyor belt loaded with cookies in a random disposition to the operator, which is common practice today, is at best an unsatisfactory procedure.

It is the primary object of the present invention to provide means which aligns cookies into distinct rows after they advance from the baking oven toward the operator for packaging. It is a co-equal object herein to provide means for aligning cookies which at the same time will do so in so gentle a fashion that there is virtually no breakage of cookies. The manner in which this object is achieved is to provide a plurality of spaced partitions between pairs of which cookies may pass while the cookies are being carried on conveyor means, and in the process of passing between such partitions, the cookies are ordered into distinct rows. It is important herein that simultaneously with the movement of cookies between the partitions, the partitions move with an oscillatory motion, thereby gently urging the advancing cookies to move to one side or another of any given partition and pass between pairs of partitions.

Still another object herein is to provide partitions which may be adjusted as to spacing in order that the apparatus may be adapted to operation though cookies of different dimensions may be produced at different times.

A further object of this invention is to provide means whereby the partitions may be lifted away from the conveyor upon which the cookies are carried, where such movement may be necessary or desirable to permit removal of cookies from the conveyor or to aid in securing access to the equipment.

It is still another object herein to further facilitate the handling of cookies so that breakage is kept to a minimum, such minimizing of breakage being achieved by supporting the partitions by resilient means. That is, the partitions, which generally will be mounted on a single supporting bar, are suspended from above by spring steel strips, so that the partitions can, in effect, float just above the conveyor means upon which the cookies are carried.

How these and many other objects are to be implemented will become clear through a consideration of the accompanying drawings wherein:

FIG. 3 is a simplified plan view taken as indicated at 3—3 of FIG. 1 in which certain elements of the structure as seen in FIG. 1 are omitted;

FIG. 6 is a view at 6—6 of FIG. 1 showing the drive belt take-up when the disc bar is raised;

FIG. 7 is a front elevational view of a plow bar which could be substituted for the disc bar in the structure illustrated in FIG. 1; and FIG. 8 is a section taken at 8—8 of FIG. 7 and drawn to a larger scale.

Figure 1:
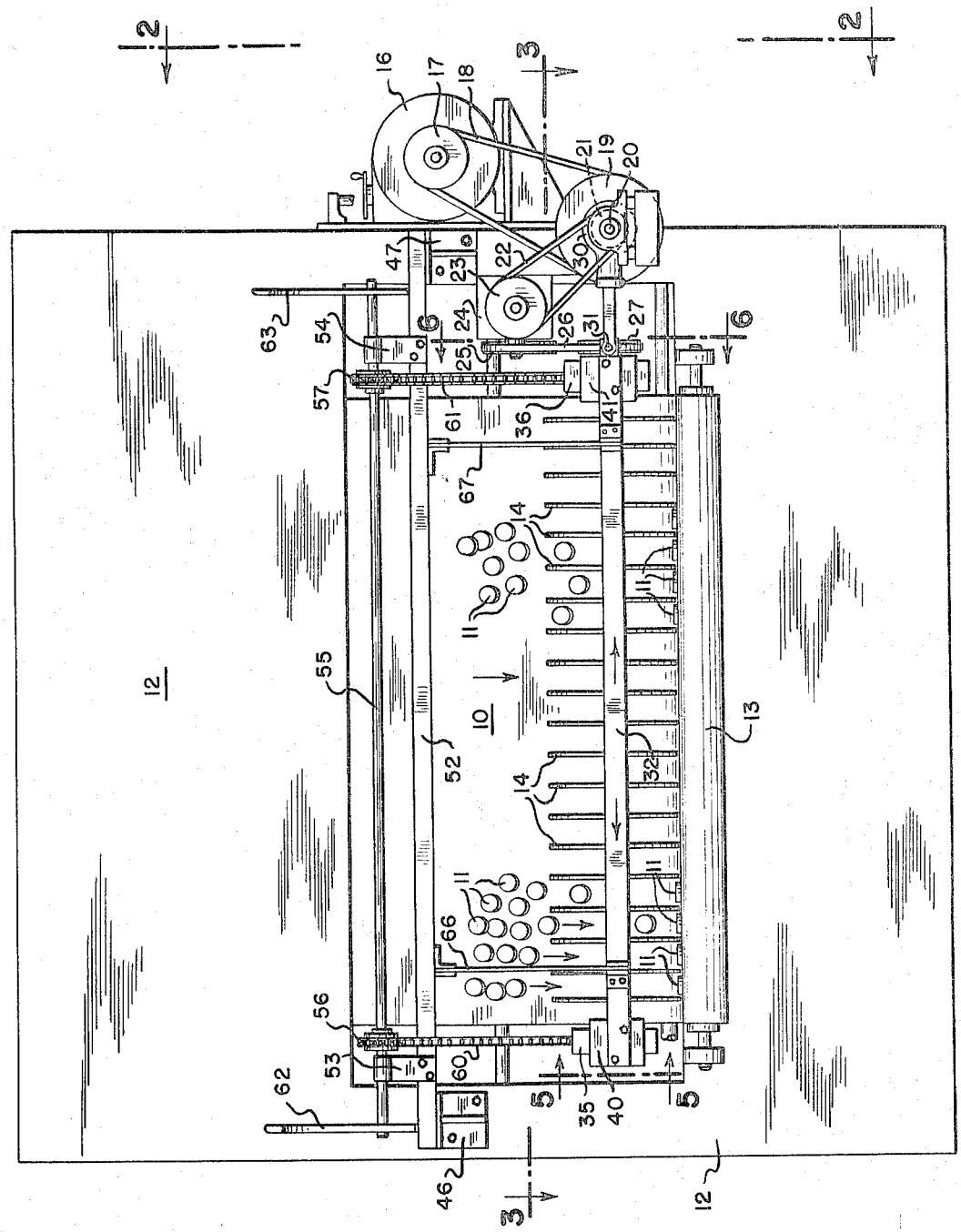
FIG. 1 is a view in front elevation showing an embodiment of my cookie aligning structure.

Cookies are frequently baked in a continuous oven, in which cookie dough is intermittently placed on a baking band by a forming die or by depositing tubes, the term "baking band" in the baking industry denoting a moving belt. The baking band then proceeds through an oven. While cookie dough is, prior to baking, deposited in a regular pattern by the means to which reference has been made, the regularity of the pattern may be upset during the cooling phase of the baking cycle as cookies are being conveyed from the oven. Where this procedure is employed, the cookies upon leaving the oven will do so in a series of uneven advancing lines. By use of the present invention these poorly established lines of cookies are aligned into well defined rows of overlapping cookies which can be readily picked up in convenient stacks for placing in packages. The nature of the transformation in the alignment of cookies is illustrated in FIGS. 1 and 3.

In the drawings, 10 identifies the conveyor belt upon which cookies 11 are advanced from the oven (the housing of which is indexed 12 in the drawings) toward the aligning apparatus which is the subject of the present invention. A second conveyor belt 13, travelling at slightly slower speed than belt 10, conducts the cookies away from the aligning apparatus. As the cookies are advanced by conveyor belt 10 they reach the plurality of discs 14 of the present structure, each pair of discs providing in effect a pair of partitions between which a single line of cookies passes. Discs 14 are mounted on a disc bar 15, and the spacing of the discs upon the disc bar is adjustable so that the present inventive structure may be used with cookies of different sizes. When the spacing of the discs is reduced for smaller cookies, additional discs may be added to the disc bar to accommodate additional rows of cookies. For a given size cookie the spacing of the discs is slightly greater than the dimension of the cookies. The discs mounted upon the disc bar rotate and also oscillate, and the cookies after passing between pairs of discs in the present structure, which discs move in the manner stated, will emerge with the desired relative relationship.

Motor 16 upon rotation turns a pulley 17, such rotation thereby driving a belt 18. Belt 18 passes over pulley 19 which pulley 19 is fixedly mounted upon jack shaft 20. The motor 16 thus drives jack shaft 20. A second pulley 21 is mounted upon jack shaft 20 to rotate therewith, and belt 22 which passes over pulley 21 also passes over pulley 23 which is mounted to cause rotation in mitre gear box 24. Rotation of jack shaft 20 thus will drive mitre gear box 24. There is a take-off pulley 25 on mitre gear box 24. Belt 26 which passes over such take-off pulley 25 passes over disc shaft pulley 27, and in this manner, rotation of jack shaft 20 causes rotation of disc bar 15.

Also mounted upon jack shaft 20 is eccentric 30, and rotation of jack shaft 20 causes oscillatory movement of eccentric 30. Eccentric 30 is pinned at 31 to oscillating bar 32. Thus, rotation of jack shaft 20 in addition to driving disc bar 15 in rotation, also drives bar 32 in oscillation. Further, disc bar 15 is mounted upon oscillating bar 32. Therefore, since rotary movement of jack shaft 20 causes both rotation of disc bar 15, and oscillation of oscillating bar 32 and these bars are intermounted, rotation of jack shaft 20 will cause both rotary and oscillatory motion of discs 14.

As may be seen in FIG. 3 disc bar 15 is mounted upon oscillating bar 32 in such manner that the disc bar with the discs 14 mounted thereon may be raised relative to the conveyor belt while still retaining its connection to the oscillating bar. This is accomplished by mounting disc bar 15 in pillow blocks 33 and 34, such pillow blocks being respectively mounted upon slide bars 35 and 36; each slide bar being respectively slidably mounted upon a slide bar base 40 and 41; such slide bar bases in turn being fixedly mounted upon oscillating bar 32. Channels 42 and 43 are provided respectively in slide bar bases 40 and 41 within which key portions 44 and 45 of slide bars 35 and 36 are respectively slidably disposed.

In order to assist in understanding how the raising of the disc bar 15 and discs 14 mounted thereon is accomplished, reference is made to fixed brackets 46 and 47 which may be mounted upon the oven housing above discs 14. Brackets 46 and 47 serve to support hanger bar 52.

Figure 2:
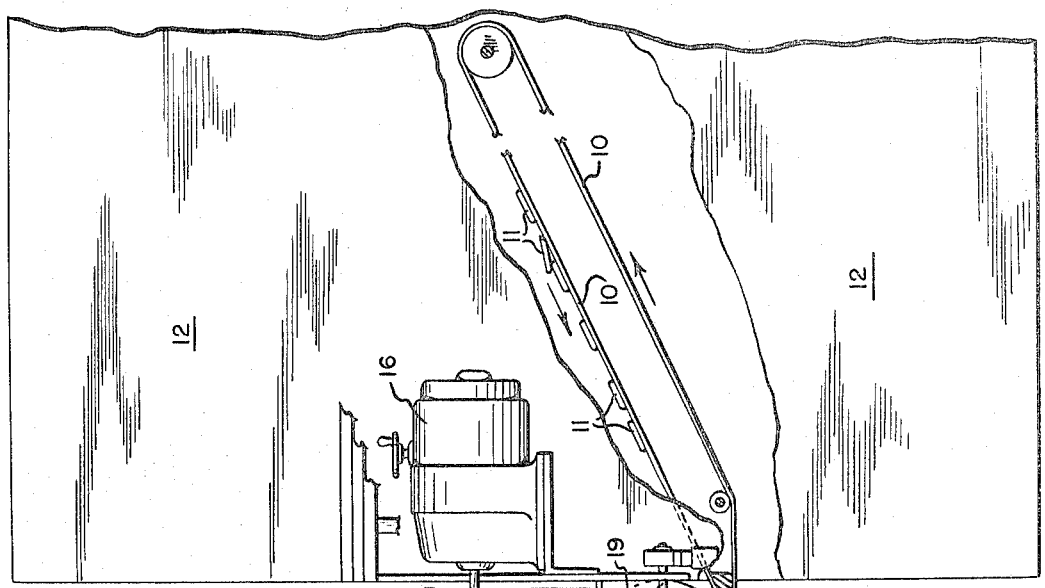
FIG. 2 is an end view of the structure seen in FIG. 1 taken in the direction indicated by the arrows 2—2 and is a side elevational view principally of the driving mechanism of the structure seen in FIG. 1.
Figure 4:
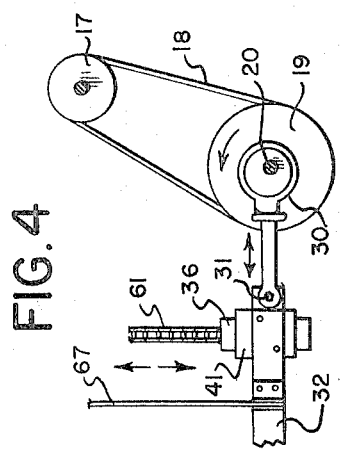
FIG. 4 is a view at 4—4 of FIG. 2 illustrating the eccentric employed in the structure.
Figure 5:
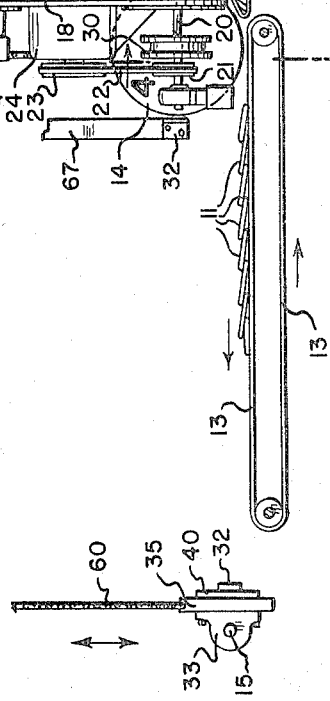
FIG. 5 is a view at 5—5 of FIG. 1 illustrating the vertical sliding means which comes into play when the disc bar is raised.

Mounted upon hanger bar 52 are two support members 53 and 54 within which brackets is journaled a shaft 55. A pair of sprockets 56 and 57 are mounted upon shaft 55, and link chains 60 and 61 respectively are fastened at their lower ends to slide bars 35 and 36, at their upper ends said chains passing over sprockets 56 and 57 respectively. Levers 62 and 63 are mounted upon shaft 55 at either end thereof. When a force is now exerted upon levers 62 and 63 in the downward direction indicated in FIG. 2, rotation of shaft 55, and sprockets 56 and 57 thereon will be caused, and rotation of the sprockets will serve to lift link chains 60 and 61. Slide bars 35 and 36 will be raised as chains 60 and 61 are raised. Since disc 14 and disc bar 15 are mounted upon slide bars 35 and 36, depression of levers 62 and 63 will raise discs 14. In this manner it will be possible to raise the discs out of the way when the conveyor belt carrying the cookies becomes overloaded, or other conditions on the conveyor belt need attention. Provision has been made whereby the discs may be operated even though displaced from their normal operative position just above the conveyor belt. As seen in FIG. 6, there is an idler take-up pulley 64 which, by means of spring 65, is spring loaded, over which belt 26 passes. Thus, when disc bar 15 is raised in the manner stated, belt 26 will continue in taut driving relationship with take-off pulley 26 and disc shaft pulley 27 because of the pressure of spring loaded idler take-up pulley so that rotation of pulley 25 can continue to drive disc bar 15.

It will be observed that while disc 14 and disc bar 15 may be raised by means of link chains 60 and 61, the primary connection between the hanger bar 52 and the rotating-oscillating discs are a pair of metal strips 66 and 67 which are vertically disposed, their top ends being fastened to hanger bar 52 and their lower ends being fastened to oscillating bar 32. The strips 66 and 67 are preferably of spring steel, so that the discs are yieldingly supported upon the overhead hanger bar 52. This expedient has proved most efficacious in achieving alignment of cookies with a minimum of breakage.

FIGS. 7 and 8 illustrate a second means for aligning rows of cookies in the present structure. In FIG. 7 is shown a shaft 70 upon which are mounted a plurality of shoes 71, such shoes being spaced in the same manner as discs 14 in FIG. 1. Shaft 70 upon which shoes 71 are mounted may be substituted in the structure of FIGS. 1–6, entirely replacing disc 14 and disc bar 15. When shaft 70 having shoes 71 thereon is substituted in the structure, belt 26 is not employed, for shoes 71 are not intended for rotation. Rather they are used when oscillating movement in conjunction with the yieldable mounting by means of spring steel strips 66 and 67 is sufficient to achieve the desired alignment for particular cookies.

While I have described and illustrated specific embodiments of my invention, it is apparent that my invention is not limited to such specific embodiments, but may be embodied in other specific structures, or in variations of the embodiments described and illustrated.

I claim:

1. A cookie aligning apparatus comprising spaced disc partition means between which cookies may pass, means for imparting oscillating and rotary motion to said disc partition means, and conveyor means for conducting cookies toward and away from said disc partition means.

2. A cookie aligning apparatus as claimed in claim 1 including resilient suspension means for said partition means.

3. A cookie aligning apparatus as claimed in claim 1 including a support, and resilient suspension means interconnecting said partition means and said support.

4. A cookie aligning apparatus as claimed in claim 1 including a support bar disposed above said partition means and spring steel strips interconnecting said support bar and said partition means, whereby said partition means are yieldably suspended.

5. A cookie aligning apparatus as claimed in claim 1 including raising means for lifting said partition means away from said conveyor means.

6. A cookie aligning apparatus as claimed in claim 1 wherein said partition means are disposed above said conveyor means and including a bar, said partition means being mounted on said bar, a support disposed above said partition means, and raising means interconnecting said support and said bar for raising said partition means away from said conveyor means.

7. A cookie aligning apparatus as claimed in claim 1 wherein said partition means are disposed above said conveyor means and including a bar, said partition means being mounted on said bar, a support disposed above said partition means, a shaft rotatably mounted on said support, a sprocket mounted to rotate with said shaft, chain means attached to said bar and in engagement with said sprocket, and lever means for rotating said shaft, whereby upon operation of said lever means, said partition means will be raised away from said conveyor means.

8. Cookie aligning apparatus comprising a plurality of substantially equally spaced discs mounted upon a first bar for rotation therewith, means for rotating said first bar, a second bar, means for driving said second bar in lateral oscillating motion, vertical slide means interconnecting said first and second bar, a support bar mounted above said discs, spring steel strip means interconnecting said second bar and said support bar, a raising shaft mounted above said discs, sprocket means mounted upon said raising shaft to rotate therewith, chain means attached to said first shaft and engaging said sprocket means, and lever means for rotating said raising shaft, whereby upon operation of said lever means said sprocket means will turn to raise said chain means and said first bar therewith, and a first conveyor to conduct cookies toward said discs and a second conveyor for conducting cookies away from said discs.

References Cited by the Examiner
UNITED STATES PATENTS

| | | | |
|---|---|---|---|
| 2,744,706 | 5/1956 | Gerdy | 248—317 |
| 2,918,718 | 12/1959 | Oberwegner | 5—88 |
| 2,941,650 | 6/1960 | Clinton | 198—30 |
| 2,955,697 | 10/1960 | Packman | 198—30 |
| 3,240,314 | 3/1966 | Griner | 198—34 |

ANDRES H. NIELSEN, *Primary Examiner.*

RICHARD E. AEGERTER, EVON C. BLUNK,
*Examiners.*